United States Patent
Su

(10) Patent No.: US 6,969,967 B2
(45) Date of Patent: Nov. 29, 2005

(54) MULTI-LEVEL DC BUS INVERTER FOR PROVIDING SINUSOIDAL AND PWM ELECTRICAL MACHINE VOLTAGES

(75) Inventor: Gui-Jia Su, Knoxville, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 0 days.

(21) Appl. No.: 10/734,940

(22) Filed: Dec. 12, 2003

(65) Prior Publication Data

US 2005/0127853 A1 Jun. 16, 2005

(51) Int. Cl.[7] .................. H02M 1/12; H02P 7/622
(52) U.S. Cl. ................................ 318/801; 363/43
(58) Field of Search ..................... 318/798–806; 363/43, 58, 71, 98, 136–138

(56) References Cited

U.S. PATENT DOCUMENTS

| | | | | |
|---|---|---|---|---|
| 3,919,619 A | * | 11/1975 | Corry | 363/71 |
| 4,032,832 A | * | 6/1977 | Miller | 363/43 |
| 4,685,043 A | * | 8/1987 | Mehnert | 363/43 |
| 5,757,633 A | * | 5/1998 | Bowles | 363/71 |
| 6,075,350 A | * | 6/2000 | Peng | 323/207 |
| RE37,126 E | * | 4/2001 | Peng et al. | 363/137 |
| 6,577,087 B2 | | 6/2003 | Su | |

* cited by examiner

Primary Examiner—Bentsu Ro
(74) Attorney, Agent, or Firm—Quarles & Brady LLP

(57) ABSTRACT

A circuit for controlling an ac machine comprises a full bridge network of commutation switches which are connected to supply current for a corresponding voltage phase to the stator windings, a plurality of diodes, each in parallel connection to a respective one of the commutation switches, a plurality of dc source connections providing a multi-level dc bus for the full bridge network of commutation switches to produce sinusoidal voltages or PWM signals, and a controller connected for control of said dc source connections and said full bridge network of commutation switches to output substantially sinusoidal voltages to the stator windings. With the invention, the number of semiconductor switches is reduced to m+3 for a multi-level dc bus having m levels. A method of machine control is also disclosed.

20 Claims, 16 Drawing Sheets

MULTI-LEVEL DC BUS INVERTER FOR PROVIDING SINUSOIDAL AND PWM ELECTRICAL MACHINE VOLTAGES

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is single-phase and polyphase ac machines, including both motors and generators.

DESCRIPTION OF THE BACKGROUND ART

Traditionally, two-level inverters with GTOs (gate turn-off thyristors) were the choice for medium- and high-voltage level applications such as motor drives and static VAR (reactive power) compensation. Multi-level inverters using IGBTs (insulated gate bipolar transistors) have been proposed for replacing the GTO-based two-level inverters in medium-voltage applications. Because IGBTs can switch faster and have less demanding gate drive requirements than GTOs, inverters with these devices can significantly reduce the size and weight of passive filter components and offer better voltage waveforms with less harmonic contents and lower dv/dt. Due to the rapid switching capability of IGBTs, it is advantageous to supply them with dc voltages in multiple levels to produce near sinusoidal output voltages. Some of the known types of configurations for these inverters are the cascaded H-bridge, diode-clamped and flying capacitor multi-level inverters. A technical problem is that as the number of dc voltage levels, m, grows, the number of active switches increases according to 2×(m−1) for the cascaded H-bridge, diode-clamped and flying capacitor multi-level inverters.

SUMMARY OF THE INVENTION

The invention relates to a circuit and a method utilizing a full bridge network of commutation switches for each phase of the inverter and a multi-level dc bus. The multi-level dc bus provides a dc voltage with the shape of staircase with or without pulse width modulation to a single-phase full bridge network of commutation switches, to alternate the polarity and produce an ac voltage.

Compared to the cascaded H-bridge, diode-clamped and flying capacitor multi-level inverters, the multi-level dc bus inverters with full bridge networks of commutation switches can significantly reduce the power semiconductor switch count as the number of voltage levels increases beyond five. For a given number of voltage levels, m, the required number of active switches is 2×(m−1) for the existing multi-level inverters, but is m+3 for the multi-level dc bus inverters.

Su, U.S. Pat. No. 6,577,087, issued Jun. 10, 2003, disclosed a multi-level dc link inverter for brushless dc machines and switched reluctance machines. For these machines, the stator windings are usually excited with a square wave, for example, either sequentially, or at least no more than two windings at a time.

The circuits of the present invention can produce sinusoidal waveforms, based on PWM signals or otherwise, in multiple phases over the same time interval. They are thus applied to ac machines, and for this application, the switch counts are reduced over prior configurations for these applications.

There is a significant reduction in the number of switches, clamping-diodes and clamping-capacitors as the number of voltage levels grows. For a given number of voltage levels, m, the required number of active switches is 2×(m−1) for the existing multi-level inverters, but is m+3 for the multi-level dc bus inverters of the present invention.

The machine control circuits of the present invention can be used for ship propulsion, electric vehicle drives, utility, industry drives, photovoltaic and fuel cell inverters.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

Figure 1:
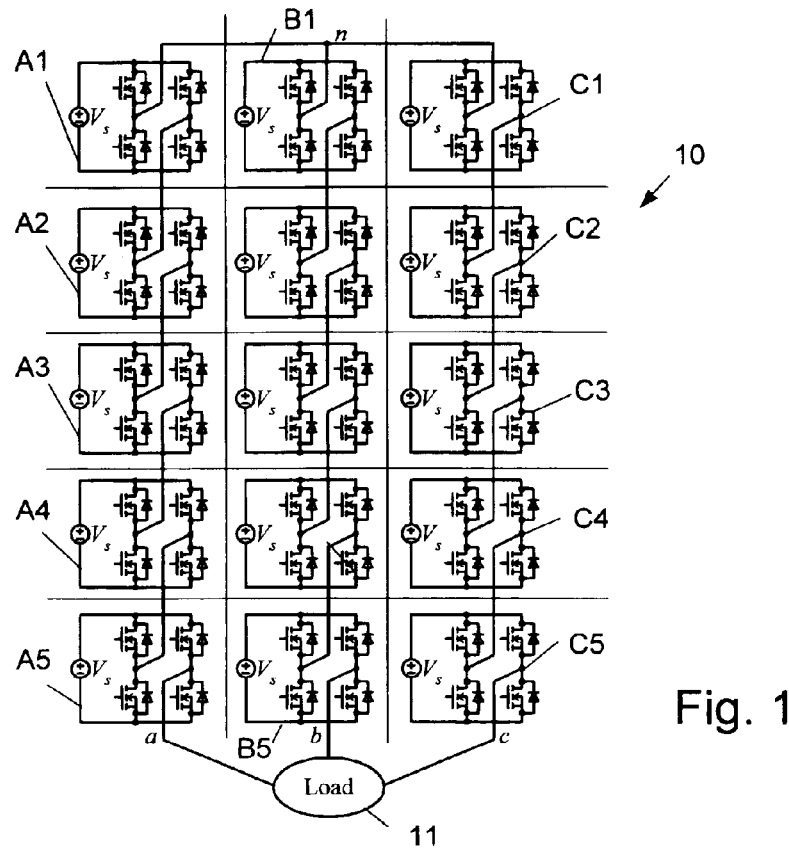
FIG. 1 is a schematic view of a three-phase Y-connected cascaded H-bridge inverter without the present invention.
Figure 2:
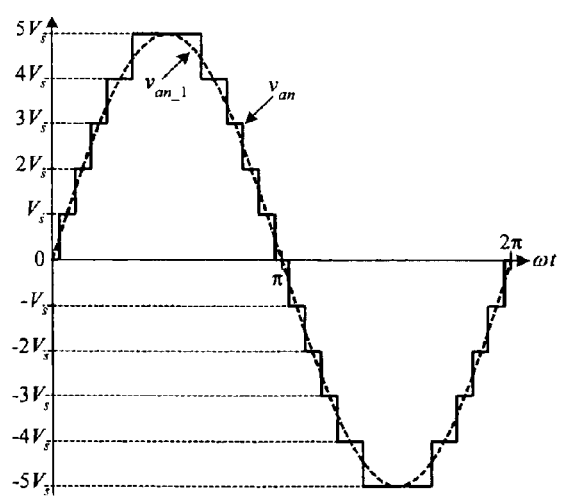
FIG. 2 is graph of voltage vs. time for an output voltage waveform produced with circuit of FIG. 1.

FIG. 1 shows the power circuit 10 for a three-phase, Y-connected cascaded H-bridge inverter with five cells A1–A5, B1–B5 and C1–C5 in each respective phase a, b and c for supplying a load 11. The phase voltage is synthesized by the addition of the voltages generated by each cell, which can have one of three values: $-V_s$, 0, or $V_s$. As seen in FIG. 2, the resulting phase voltage, $V_{an}$ has a staircase shape of eleven levels, $5V_s$, $4V_s$, $3V_s$, $2V_s$, $V_s$, 0, $-V_s$, $-2V_s$, $-3V_s$, $-4V_s$, $-5V_s$, to approximate a sinusoidal voltage, $v_{an\_1}$.

Figure 3:
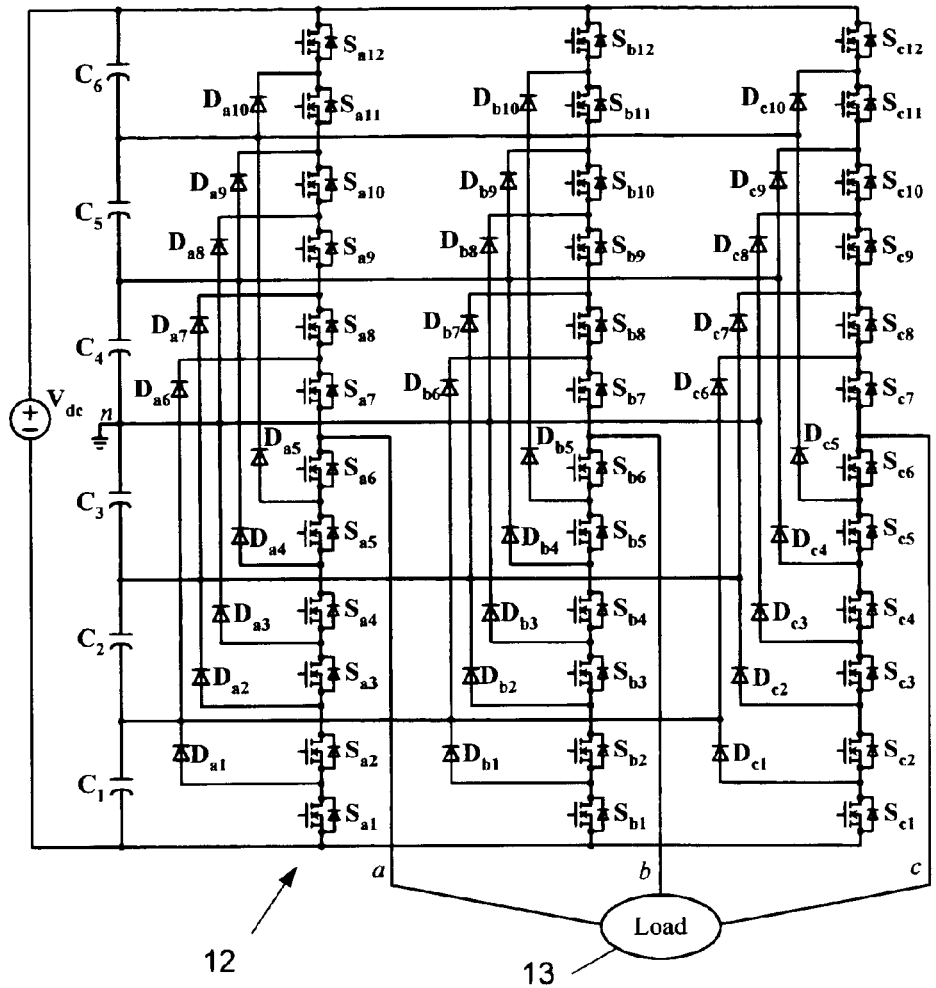
FIG. 3 is a schematic view of a three-phase Y-connected diode-clamped inverter without the present invention.
Figure 4:
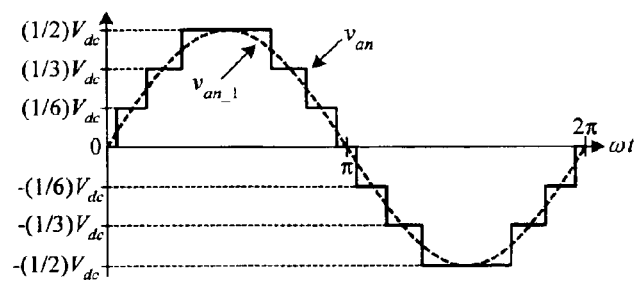
FIG. 4 is graph of voltage vs. time for an output voltage waveform produced with circuit of FIG. 3.

FIG. 3 illustrates a seven-level diode-clamped inverter 12 for supplying a load 13. In this circuit 12, the dc source voltage, $V_{dC}$ is split into six levels by six series-connected capacitors, $C_1$–$C_6$. Defining the middle point of the capacitors n as the zero-reference point for the phase voltages and assuming the dc source voltage, $V_{dC}$ is evenly divided by the capacitors, the inverter can produce staircase-shaped phase voltages of seven levels: $V_{dc}/2$, $V_{dc}/3$, $V_{dc}/6$, 0, $-V_{dc}/6$, $-V_{dc}/3$, and $-V_{dc}/2$, as illustrated in FIG. 4. The staircase-shaped waveform, $v_{an}$, is an approximation of a sinusoidal wave denoted by $v_{an\_1}$ in the FIG. 4. Ideally, the voltage across each of the switching devices, $S_{a1}$–$S_{a12}$, $S_1$–$S_{b12}$, and $S_{c1}$–$S_{c12}$ is clamped to $V_{dc}/6$ by the diodes $D_{a1}$–$D_{a10}$, $D_{b1}$–$D_{b10}$, and $D_{c1}$–$D_{c10}$.

Figure 5:
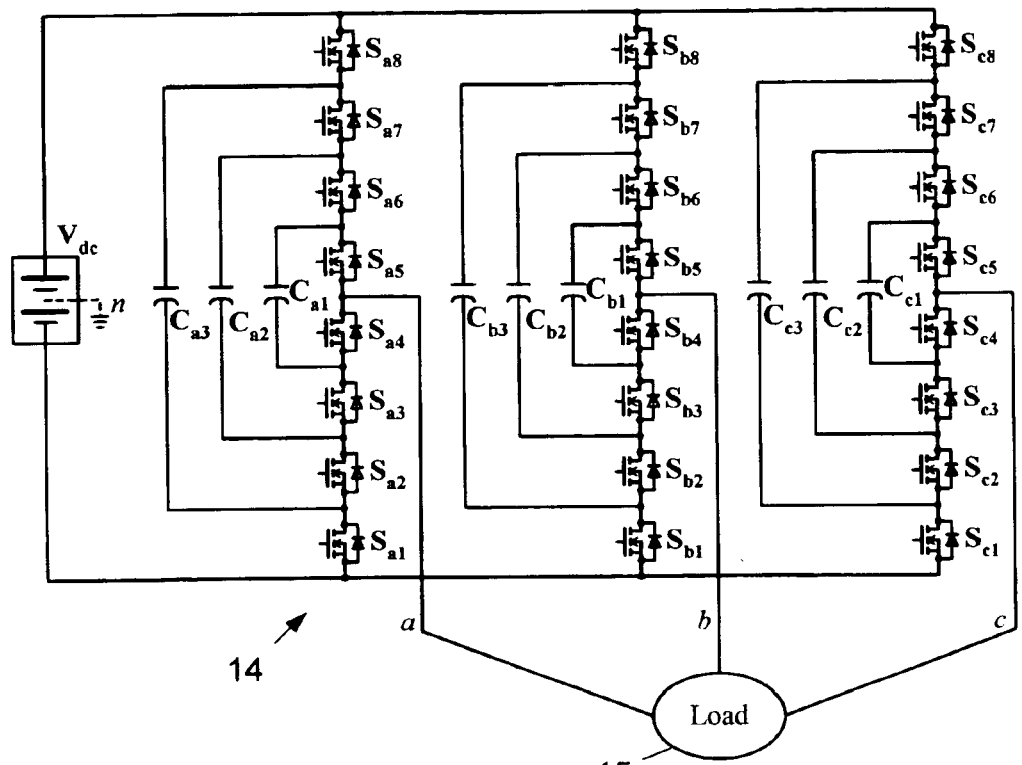
FIG. 5 is a schematic view of a three-phase Y-connected capacitor-clamped inverter without the present invention.
Figure 6:
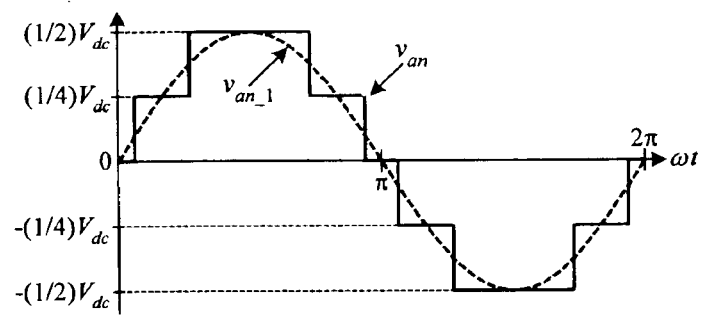
FIG. 6 is graph of voltage vs. time for an output voltage waveform produced with circuit of FIG. 5.

FIG. 5 illustrates a three-phase capacitor clamped multi-level inverter 14 for supplying a load 15, in which five-level dc phase voltages are generated. The circuit 14 is also called the flying capacitor inverter. By proper control of the switches $S_{a1}$–$S_{a8}$, $S_{b1}$–$S_{b8}$, and $S_{c1}$–$S_{c8}$, the dc bus voltages provided by the clamping capacitors $C_{a1}$, $C_{a2}$ and $C_{a3}$ will be $V_{dc}/4$, $V_{dc}/2$ and $3V_{dc}/4$, respectively. The same holds true for the phase-b and phase-c flying capacitors, $C_{b1}$, $C_{b2}$ and $C_{b3}$, $C_{c1}$, $C_{c2}$ and $C_{c3}$. As seen in FIG. 6, taking the midpoint, n of the dc voltage source $V_{dc}$ as the reference point, the inverter provides five levels to the phase voltages, i.e., $V_{dc}/2$, $V_{dc}/4$, 0, and $-V_{dc}/4$, $-V_{dc}/2$.

For a given number of voltage levels, m, the number of active switches in each phase is 2×(m−1) for the aforementioned cascaded H-bridge, diode-clamped and flying capacitor multi-level inverters. In addition, for each phase, the diode-clamped inverter requires at least 2×(m−2) clamping diodes and the flying capacitor inverter needs at least (m−2) clamping capacitors.

The present invention introduces a new class of multi-level inverters based on a multi-level dc bus and a full bridge network inverter. A multi-level dc bus can be realized by a diode-clamped phase leg, a flying capacitor phase leg, a series connection of half-bridge cells with each having its own dc source, or a combination of the three. A multi-level voltage source inverter can be formed by connecting a multi-level dc bus with a single-phase full bridge (SPFB) inverter. The multi-level dc bus provides a unipolar voltage with the shape of a staircase that approximates the rectified shape of a sinusoidal wave, with or without pulse width modulation (PWM), to the SPFB inverter, which in turn alternates the polarity to produce an ac voltage. Compared with the existing multi-level inverters, the new multi-level dc bus inverters can significantly reduce the switch count as the number of voltage levels increases beyond five. For a given number of voltage levels, m, the new inverters requires m+3 active switches.

Figure 7:
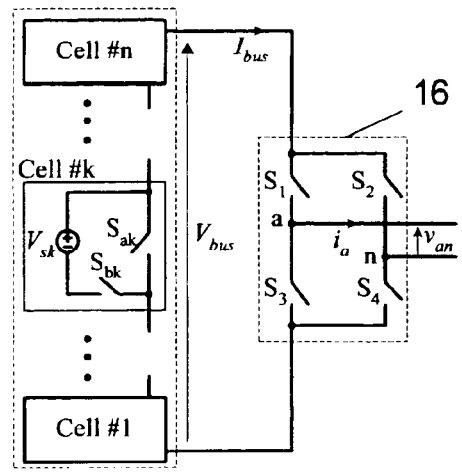
FIG. 7 is a schematic view of a multi-level dc bus single-phase full bridge inverter of the present invention.

FIG. 7 shows a schematic diagram of the proposed inverter topology based on half-bridge cells #1 . . . #n connected in series. Each cell #1 . . . #n has a voltage source $V_{sk}$ (k=1 to n) controlled by two switches; a bypass switch identified by $S_{ak}$ and an insertion switch denoted by $S_{bk}$. The two switches, $S_{ak}$ and $S_{bk}$ operate in a complementary fashion; one must be on and the other must be off. The cell's dc source, $V_{sk}$, is bypassed with $S_{ak}$ on and $S_{bk}$ off, or inserted into the dc link voltage by reversing the "on" and "off" status of the switches.

Figure 8:
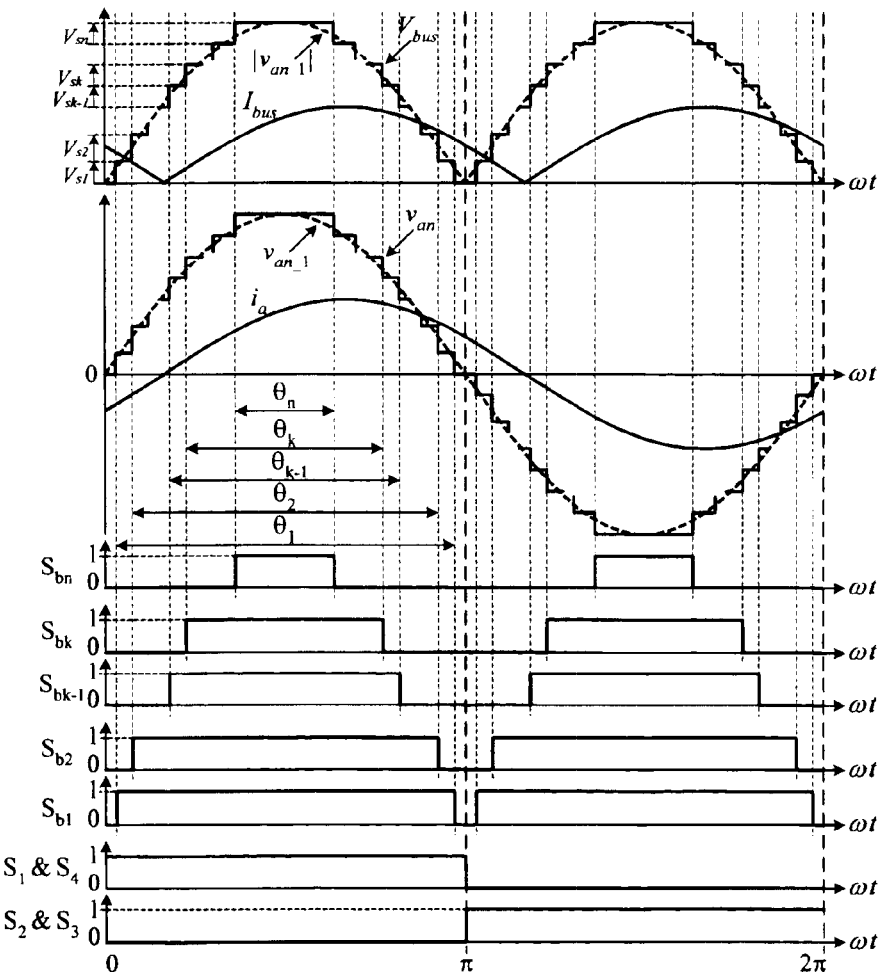
FIG. 8 is a graph of voltage signals vs. time for the inverter of FIG. 7.

FIG. 8 illustrates the operating voltage, current and gating signal waveforms without pulse width modulation (PWM) for an inductive load, where $V_{bus}$ is the dc bus voltage of the SPFB inverter, $I_{bus}$ is the dc bus current, $v_{an}$ is the output ac voltage, $v_{an\_1}$ the fundamental components of $v_{an}$, $i_a$ is the output ac current, and $S_1$–$S_4$, $S_{b1}$–$S_{bn}$ represent the corresponding switch's gating signals—a "1" gating signal corresponds to an "on" status and a "0" gating signal corresponds to an "off" status. The multi-level dc bus inverter formed by the n half-bridge cells provides a staircase-shaped dc bus voltage of n steps that approximates the rectified waveform of the sinusoidal voltage, $V_{an\_1}$, to the single phase full bridge network 16 of commutation switches $S_1$–$S_4$, which in turn alternates the voltage polarity to produce an ac voltage, $v_{an}$ of a staircase shape with (2×n+1) levels, i.e., $-(V_{s1}+V_{s2}+ \ldots +V_{sn})$, $-(V_{s1}+V_{s2}+ \ldots +V_{sn-1})$, $\ldots$, $-V_{s2}$, $-V_{s1}$, 0, $V_{s1}$, $V_{s2}$, $\ldots$, $(V_{s1}+V_{s2}+ \ldots +V_{sn-1})$, $(V_{s1}+V_{s2}+ \ldots +V_{sn})$. The dc bus voltage and current are therefore related to its output ac counterpart by the following expression:

$$V_{bus}=|v_{an}|, I_{bus}=|i_a| \tag{1}$$

Assuming each cell adds its source voltage $V_{sk}$ to the dc bus over an angular period of $\theta_k$ in each half cycle, the peak fundamental component is determined by $$v_{an\_1(peak)} = \frac{4}{\pi}\sum_{k=1}^{n} V_{sk}\sin\frac{\theta_k}{2}. \tag{2}$$

While the switches in the cells, $S_{ak}$ and $S_{bk}$, can perform PWM if necessary, the switches of the SPFB inverter 16 always work in pairs, $S_1$ and $S_4$, $S_2$ and $S_3$, and flip the polarity of the dc bus voltage at the fundamental frequency of the output voltage.

Figure 9:
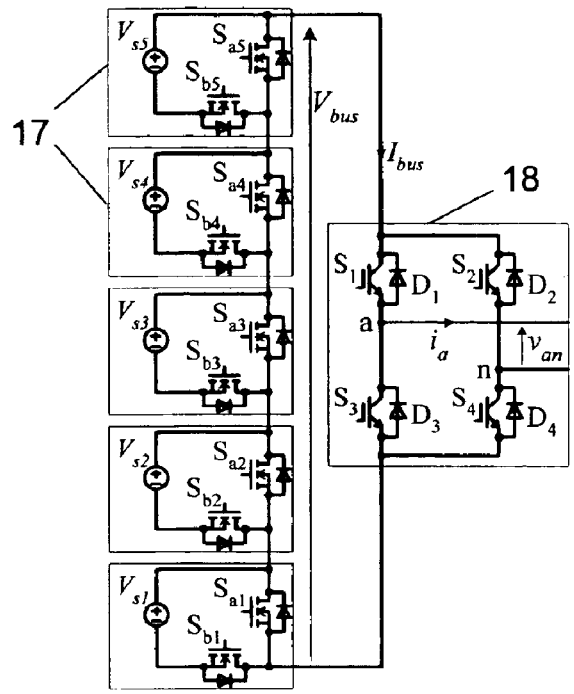
FIG. 9 is more detailed schematic view of a multi-level dc bus single-phase full bridge inverter of the present invention.
Figure 10:
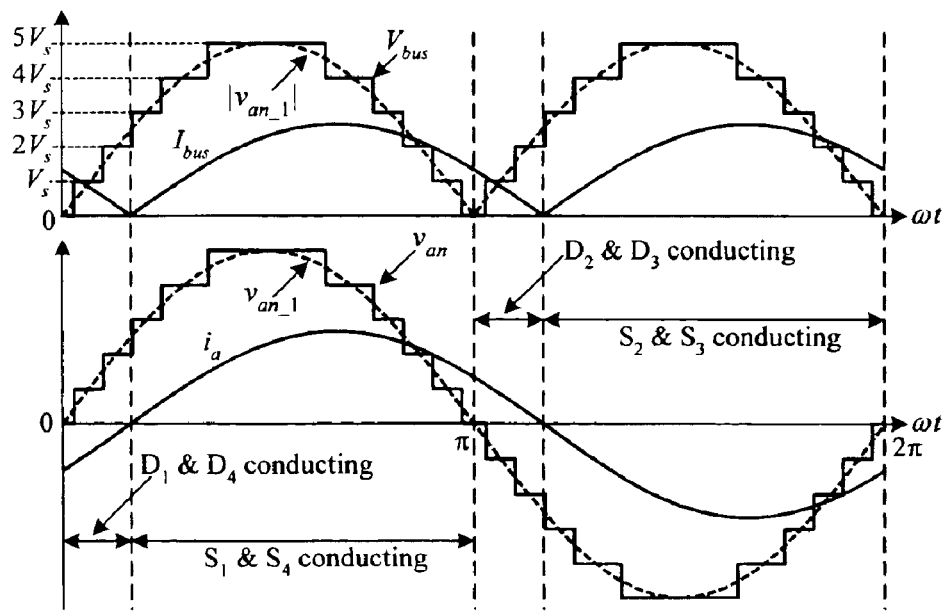
FIG. 10 is a graph of voltage signals vs. time without pulse width modulation for the inverter of FIG. 9.
Figure 11:
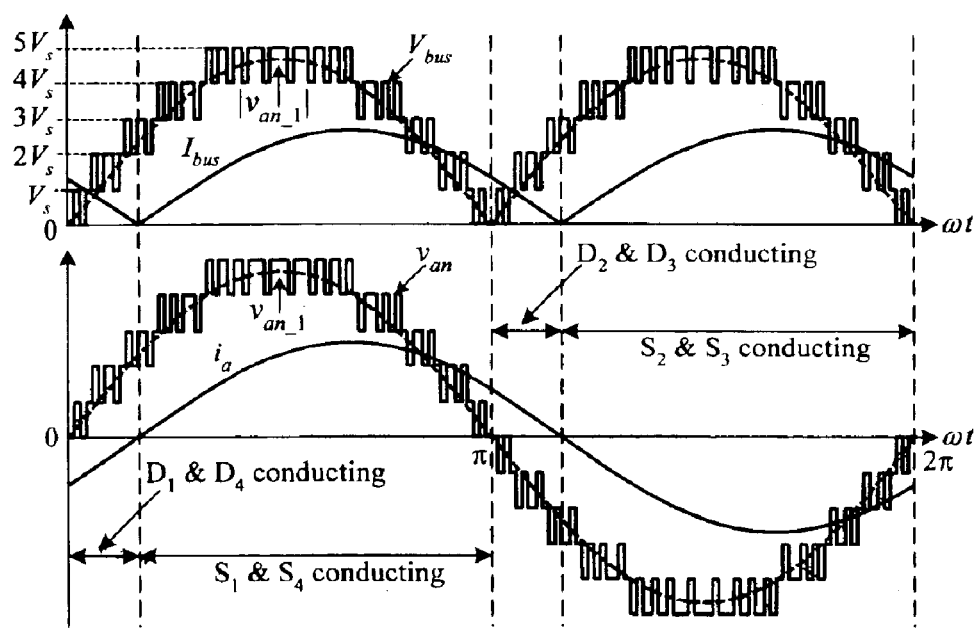
FIG. 11 is a graph of voltage signals vs. time with pulse width modulation for the inverter of FIG. 9.

FIG. 9 shows an embodiment of the invention using semiconductors such as MOSFETs as the switches in the dc multi-level cells 17 and IGBTs as the commutation switches in the bridge network 18. The inverter can produce an eleven-level ac voltage. FIG. 10 illustrates the operating waveforms, where the source voltage of the cells is selected to have the same value of $V_s$ for an inductive load. With an inductive load, the current, $i_a$ lags in phase with respect to the voltage, $v_{an}$. Also, the switch pair of $S_1$ and $S_4$ is gated on when $v_{an}$ is positive and the other switch pair of $S_2$ and $S_3$ is gated on when $v_{an}$ is negative. Their anti-parallel diodes $D_1$ and $D_4$ or $D_2$ and $D_3$ will actually be conducting the load current when $v_{an}$ and $i_a$ have opposite polarities. FIG. 11 illustrates the operating waveforms when the cell switches perform pulse width modulation. To minimize the pulse voltage swing, each cell except the last one provides pulse width modulation only during the beginning portion, before the next cell is added to the dc bus voltage, and during the ending portion, after the added cell is removed from the dc bus voltage. Each cell keeps the cell's dc source in the dc bus voltage over the overlapping region. The last cell can perform pulse width modulation over its entire period.

Figure 12:
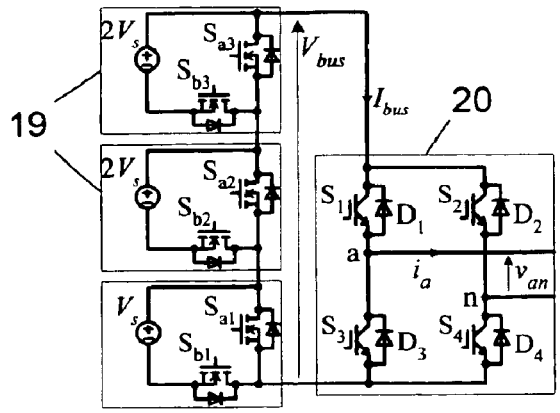
FIG. 12 is a modification of the circuit of FIG. 9 using fewer switches in the multi-level dc bus voltage supply.
Figure 13:
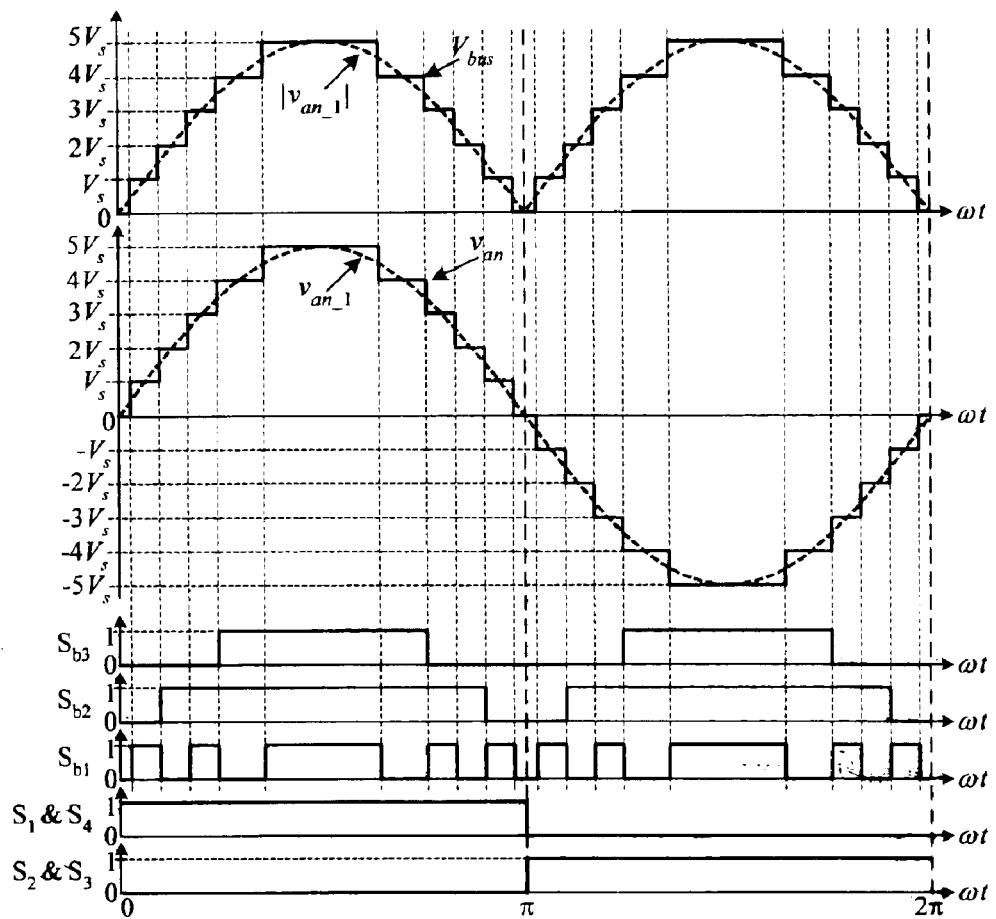
FIG. 13 is a graph of voltage signals vs. time for the inverter of FIG. 12.

Although it is convenient to select the same voltage for all of the cell dc sources, it is possible to reduce the number of cells for the same number of voltage levels by properly setting the dc source voltages. For instance, to produce the eleven-level voltage shown in FIG. 13, the number of cells 19 can be reduced to three by choosing the source voltages as $V_s$, $2V_s$, $2V_s$, respectively, as shown in FIG. 12. In general, for an inverter having n cells with a binary distribution of dc source voltage, i.e. $V_{sk}=2^{k-1}V_s$, k=1 ... n, the maximum number of level will be $2^{n+1}-1$.

Figure 14:
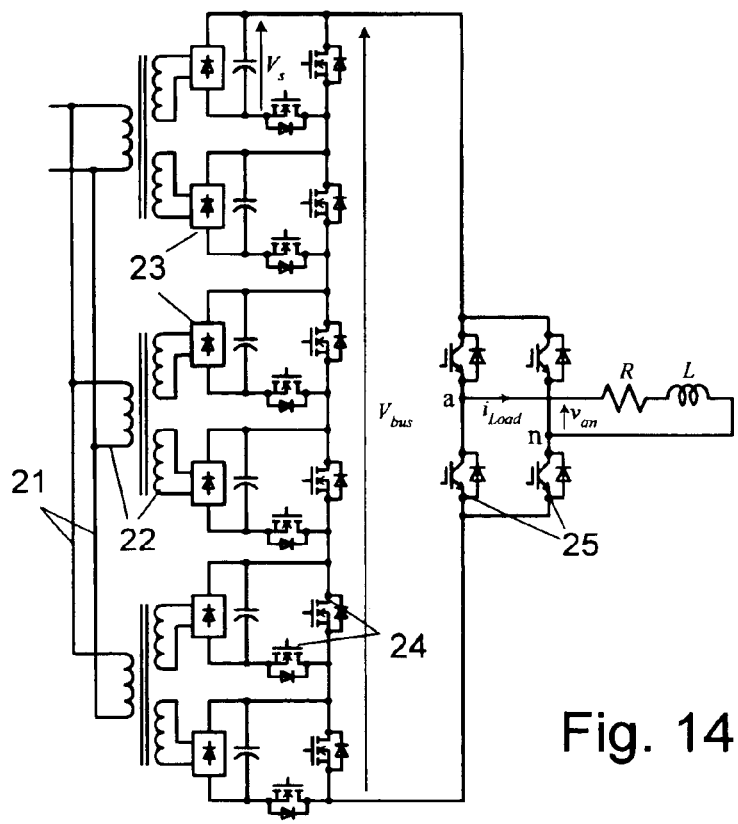
FIG. 14 is a schematic view of a test circuit for demonstrating the present invention using diode rectifiers and transformers to produce the multi-level dc voltage supply and using a resistive and inductive load.
Figure 15:
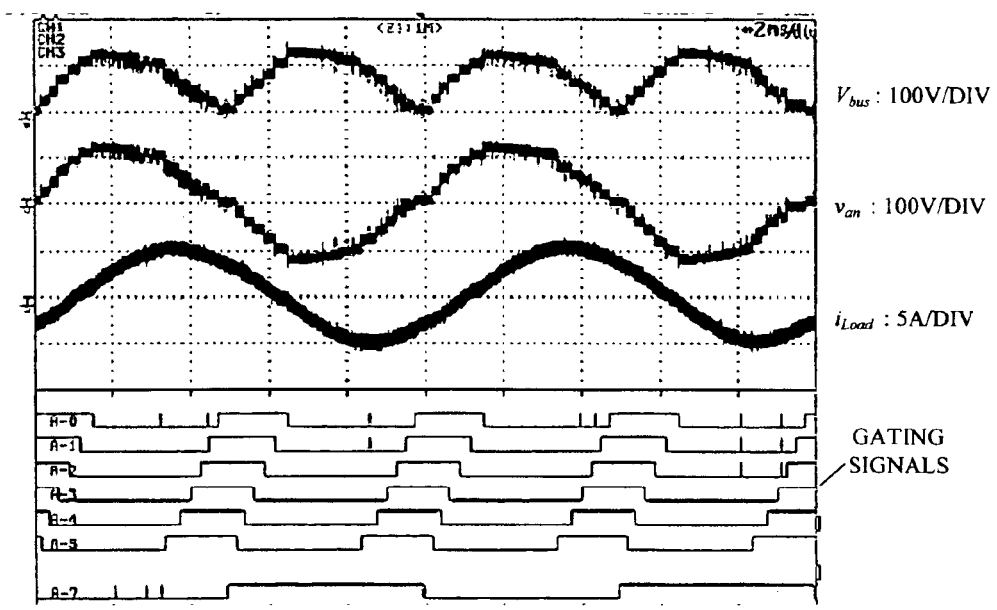
FIG. 15 is a graph of test voltage signals and load current signals vs. time produced from the circuit of FIG. 14.

For proof-of-concept, a single-phase thirteen-level multilevel dc bus inverter was assembled and tested with an inductive load L and a resistive load R (R=13.2 ohms, L=10 mH) as shown in FIG. 14. The individual dc sources are obtained by using diode rectifiers 23 and transformers 22 operating off the utility line 21. FIG. 15 shows typical experimental waveforms when the inverter was programmed to produce a sinusoidal output voltage and all switches 24, 25 are switching at the fundamental frequency, 100 Hz.

Figure 16:
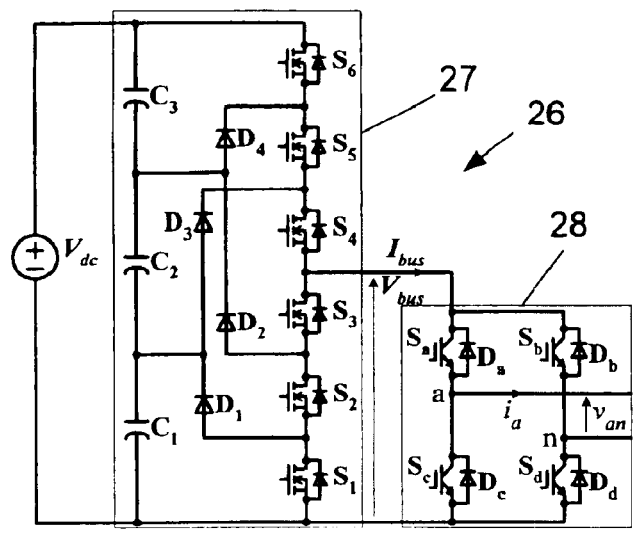
FIG. 16 is a schematic view of a multi-level dc bus single-phase full bridge inverter of the present invention using diode-clamped phase legs in the dc voltage supply.
Figure 17:
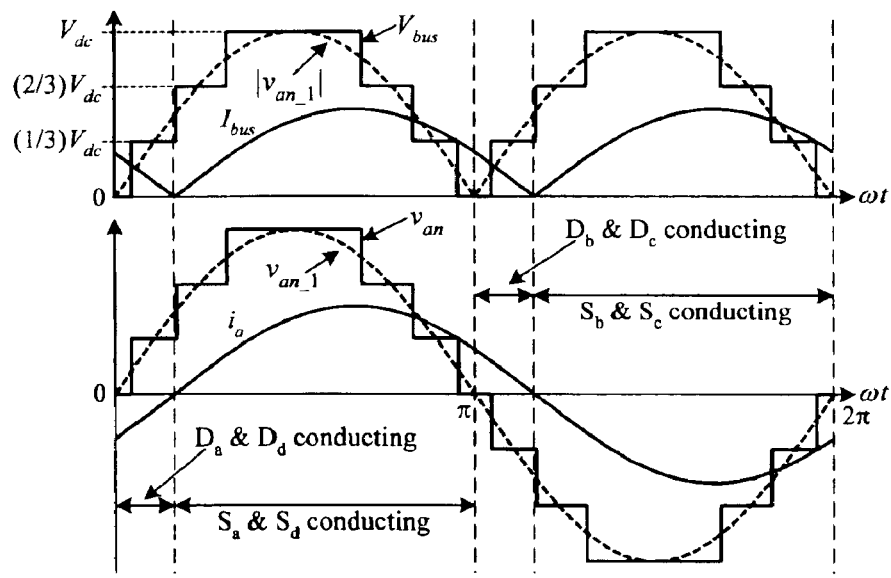
FIG. 17 is a graph of voltage signals vs. time for the inverter of FIG. 16.

The diode-clamped phase leg and the flying capacitor-clamped phase leg can also be used to provide a multi-level dc bus voltage with the shape of a staircase to the SPFB inverter. FIG. 16 shows a seven-level multi-level dc bus inverter based on a diode-clamped phase leg 27 and a single-phase bridge 28. The diode-clamped phase leg 27, consisting of six switches, $S_1$–$S_6$, four clamping diodes, $D_1$–$D_4$ and a voltage divider of three capacitors, $C_1$–$C_3$, provides a dc bus voltage of four voltage levels, 0, $(\frac{1}{3})V_{dc}$, $(\frac{2}{3})V_{dc}$ and $V_{dc}$, by turning on simultaneously $(S_1,S_2,S_3)$, $(S_2,S^3,S_4)$, $(S_3, S_4, S_5)$, and $(S_4, S_5, S_6)$, respectively. The SPFB inverter 28 flips the polarity of the dc bus voltage, $V_{bus}$ to produce a seven-level ac voltage, $v_{an}$ as shown in FIG. 17, where the dc bus current, $I_{bus}$, inverter output current, $i_a$ and the current conducting states of the switches, $S_a$–$S_c$ and diodes, $D_a$–$D_c$ in the SPFB are shown for inductive load.

Figure 18:
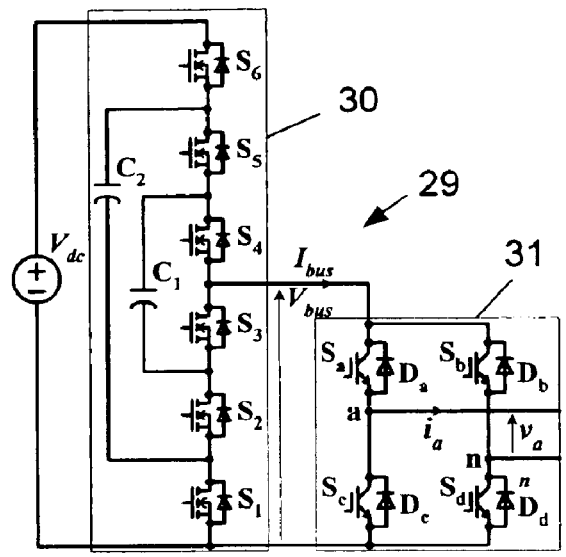
FIG. 18 is a schematic view of a multi-level dc bus single-phase full bridge inverter of the present invention using capacitor-clamped phase legs in the dc voltage supply.

FIG. 18 is a seven-level multi-level dc bus inverter 29 based on a capacitor-clamped phase leg 30 and a single-phase bridge 31. The capacitor-clamped phase leg, comprising six switches, $S_1$–$S_6$, and two clamping capacitors, $C_1$ and $C_2$, provides a dc bus voltage of four voltage levels, 0, $(\frac{1}{3})V_{dc}$, $(\frac{2}{3})V_{dc}$ and $V_{dc}$, by turning on the switches according the voltage levels as listed in Table 1 below.

TABLE 1

| $V_{bus}$ | Switches to be turned on | Charge/discharge the capacitors |
|---|---|---|
| 0 | $S_1\ S_2\ S_3$ | No |
| $(\frac{1}{3})V_{dc}$ | $(S_1\ S_2\ S_4)$ or | Discharge $C_1$ |
|  | $(S_1\ S_3\ S_5)$ or | Charge $C_1$ and discharge $C_2$ |
|  | $(S_2\ S_3\ S_6)$ | Charge $C_2$ |

TABLE 1-continued

| $V_{bus}$ | Switches to be turned on | Charge/discharge the capacitors |
|---|---|---|
| $(\frac{2}{3})V_{dc}$ | $(S_1\ S_4\ S_5)$ or | Discharge $C_2$ |
|  | $(S_3\ S_5\ S_6)$ | Charge $C_1$ |
| $V_{dc}$ | $S_4\ S_5\ S_6$ | No |

Figure 19:
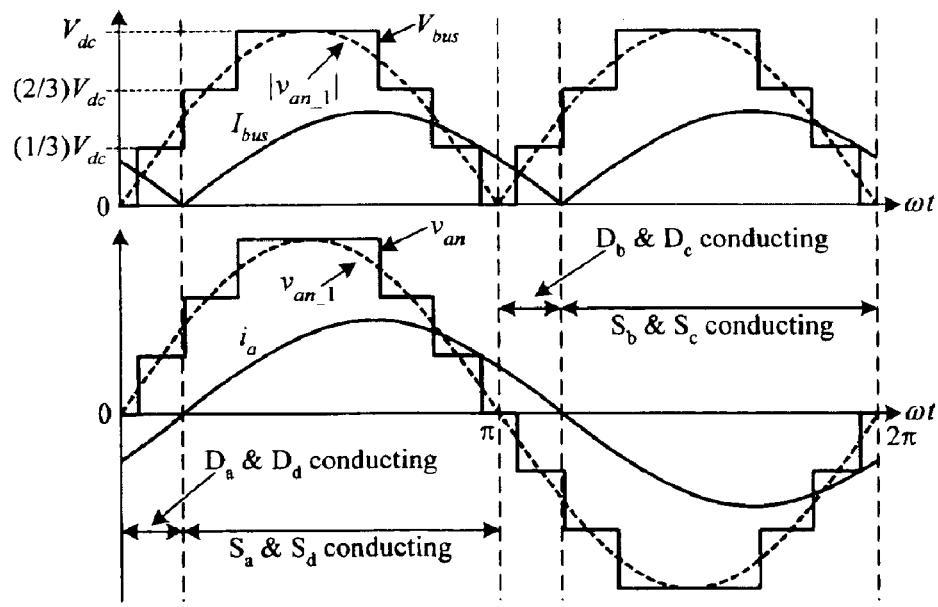
FIG. 19 is a graph of voltage signals vs. time for the inverter of FIG. 18.

There are multiple choices of switch combinations to produce the two middle levels and the capacitors will be charged or discharged as indicated in Table 1 above. By controlling the duration of these switch combinations, the voltage across $C_1$ and $C_2$ can be kept at $(\frac{1}{3})V_{dc}$ and $(\frac{2}{3})V_{dc}$, respectively. The SPFB inverter 31 flips the polarity of the dc bus voltage, VbU, to produce a seven-level ac voltage, $v_{an}$ as shown in FIG. 19, where the dc bus current, $I_{bus}$, inverter output current, $i_a$ and the current conducting states of the switches, $S_a$–$S_c$ and diodes, $D_a$–$D_c$ in the SPFB are shown for inductive load.

Figure 20:
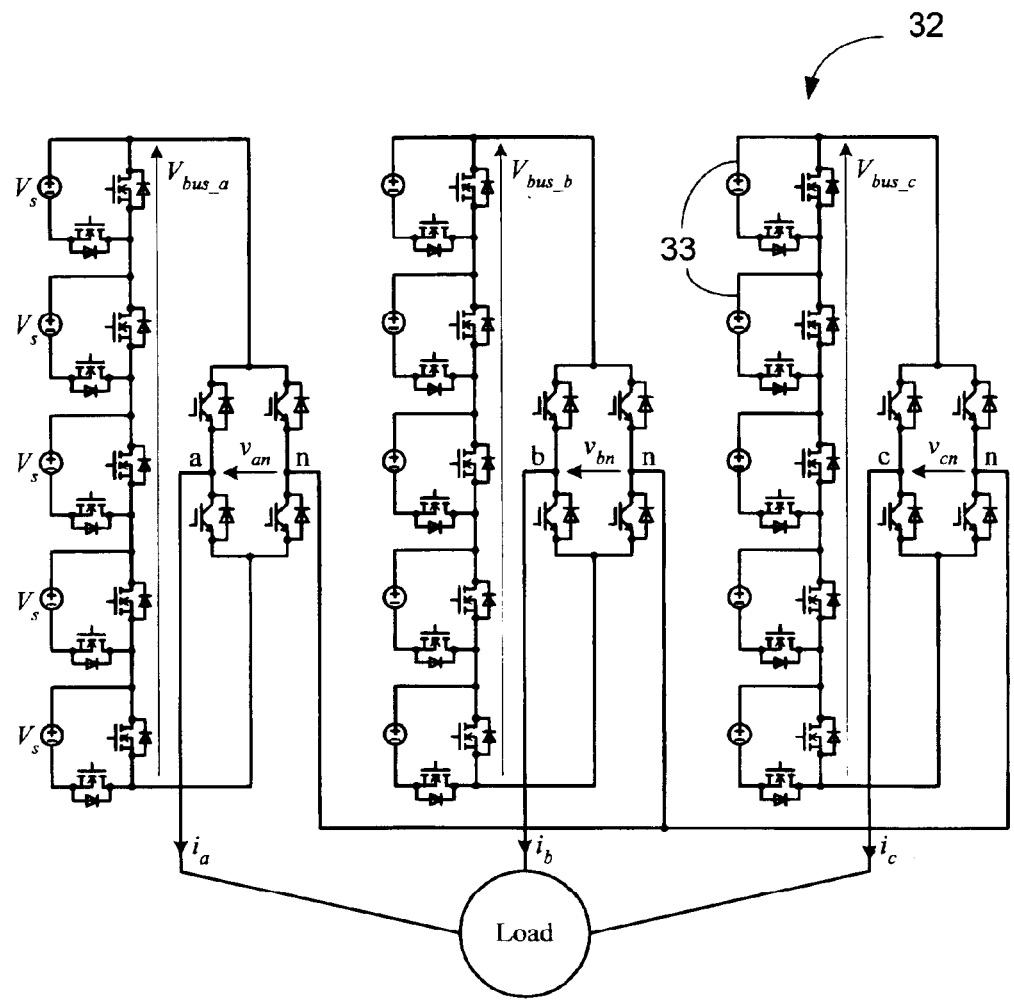
FIG. 20 is a schematic view of a three-phase Y-connected inverter of the present invention.
Figure 21:
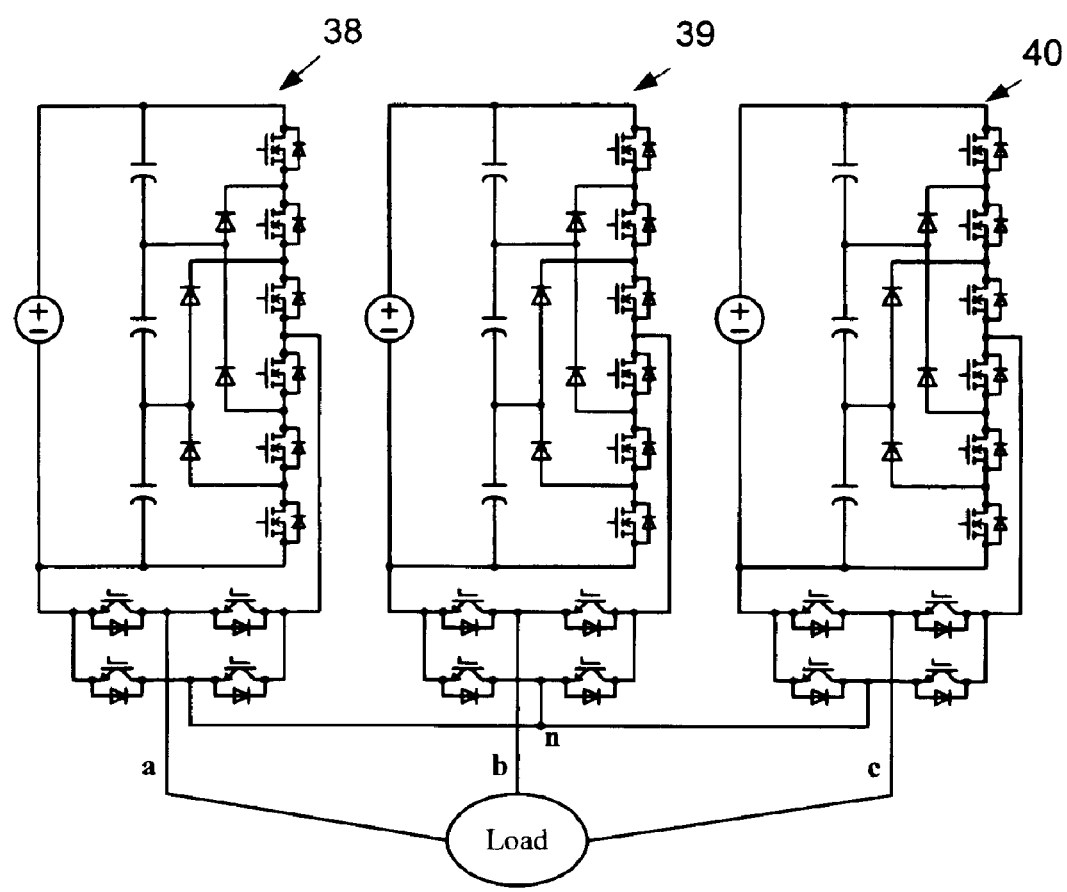
FIG. 21 is a schematic view of a three-phase Y-connected inverter of the present invention with diode-clamped legs.
Figure 22:
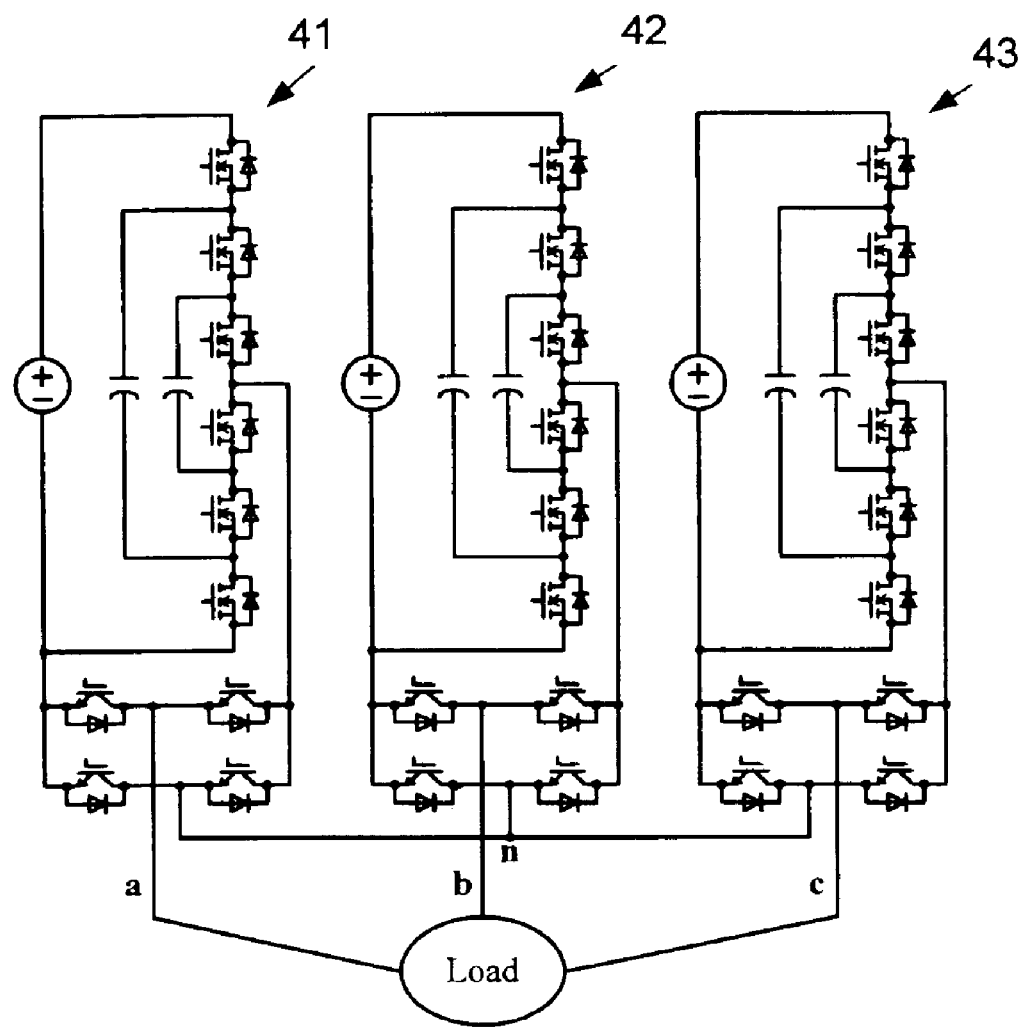
FIG. 22 is a schematic view of a three-phase Y-connected inverter of the present invention with capacitor-clamped legs.

The aforementioned single-phase circuits can be connected in star or delta fashion to provide multiple-phase configurations. FIG. 20 shows a Y-connected three-phase multi-bus inverter 32 based on the cascaded half-bridge cells 33 that can produce eleven-level phase voltages (m=11). As a result, the number of semiconductor switches according to the invention is fourteen (14) per phase (m+3). According to the prior art, the number of semiconductor switches would have been 2(m−1)=20. FIGS. 21 and 22 are Y-connected three-phase seven-level inverters (m=7) based on three diode-clamped legs 38, 39 and 40 and three capacitor-clamped legs 41, 42 and 43, respectively. As a result, the number of semiconductor switches according to the invention is ten (10) per phase (m+3). According to the prior art, the number of semiconductor switches would have been 2(m−1)=12.

Figure 23:
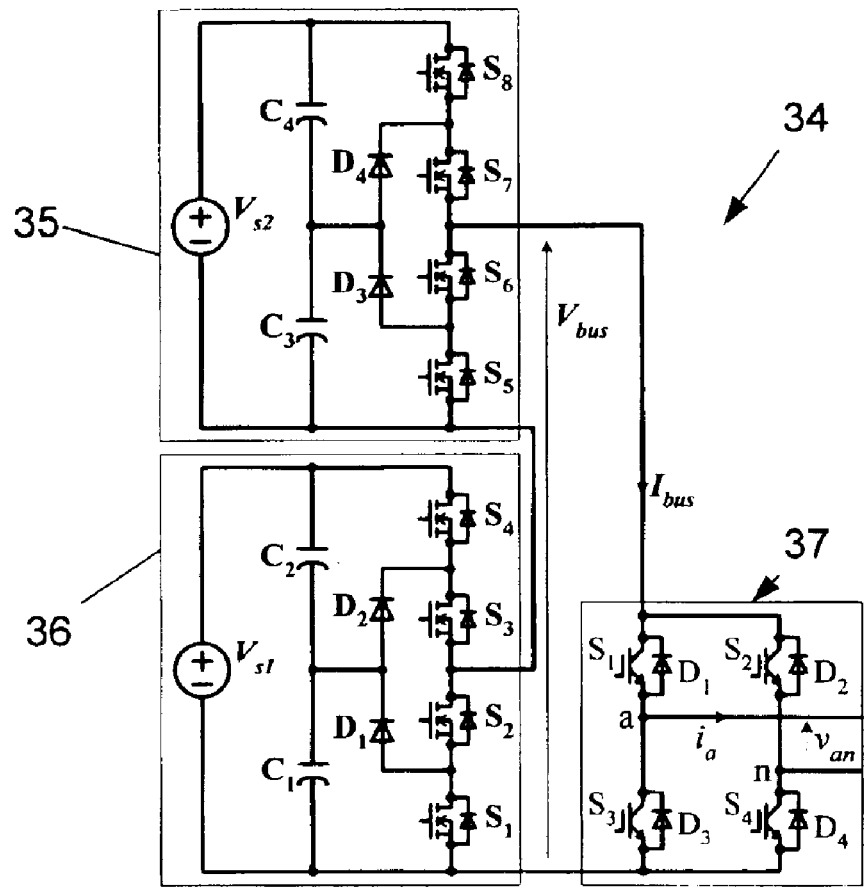
FIG. 23 is a schematic view of a single-phase inverter of the present invention using two three-level diode-clamped legs.

The diode-clamped legs, capacitor-clamped legs and the half-bridge cells can be stacked together to form a multi-level dc bus. As an example, FIG. 23 shows a single-phase inverter 34 using two three-level diode clamped legs 35, 36 and a SPFB inverter 37. The combinations of the switch "on" or "off" states to produce the possible levels are listed in Table 2. The inverter can produce a nine-level ac voltage if the voltage of the two dc sources are equal, $V_{s1}=V_{s2}$, otherwise it can generate a seventeen-level ac voltage.

TABLE II

| Positive $v_{an}$ | Switches to be turned on | Negative $v_{an}$ | Switches to be turned on |
|---|---|---|---|
| $V_{s1} + V_{s2}$ | $S_7, S_8, S_3, S_4$  $S_a, S_d$ | $-(V_{s1} + V_{s2})$ | $S_7, S_8, S_3, S_4$  $S_b, S_c$ |
| $V_{s1} + V_{s2}/2$ | $S_6, S_7, S_3, S_4$ | $-(V_{s1} + V_{s2}/2)$ | $S_6, S_7, S_3, S_4$ |
| $V_{s1}/2 + V_{s2}$ | $S_7, S_8, S_2, S_3$ | $-(V_{s1}/2 + V_{s2})$ | $S_7, S_8, S_2, S_3$ |
| $V_{s1}/2 + V_{s2}/2$ | $S_6, S_7, S_2, S_3$ | $-(V_{s1}/2 + V_{s2}/2)$ | $S_6, S_7, S_2, S_3$ |
| $V_{s2}$ | $S_7, S_8, S_1, S_2$ | $-V_{s2}$ | $S_7, S_8, S_1, S_2$ |
| $V_{s1}$ | $S_5, S_6, S_3, S_4$ | $-V_{s1}$ | $S_5, S_6, S_3, S_4$ |
| $V_{s2}/2$ | $S_6, S_7, S_1, S_2$ | $-V_{s2}/2$ | $S_6, S_7, S_1, S_2$ |
| $V_{s1}/2$ | $S_5, S_6, S_2, S_3$ | $-V_{s1}/2$ | $S_5, S_6, S_2, S_3$ |
| 0 | $S_5, S_6, S_1, S_2$ | $-0$ | $S_5, S_6, S_1, S_2$ |

Figure 24:
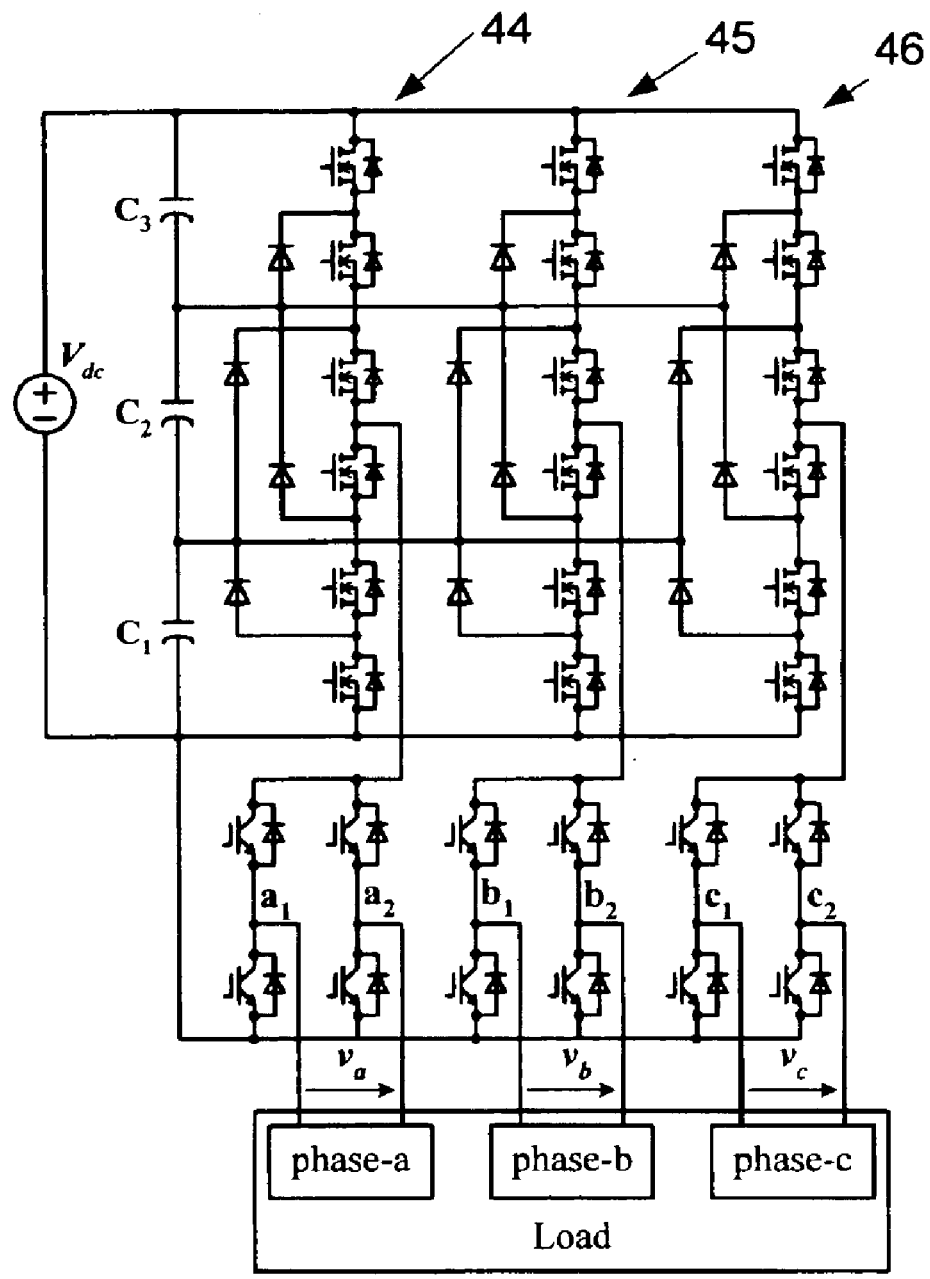
FIG. 24 is a schematic view of a three-phase inverter of the present invention using diode-clamped legs.
Figure 25:
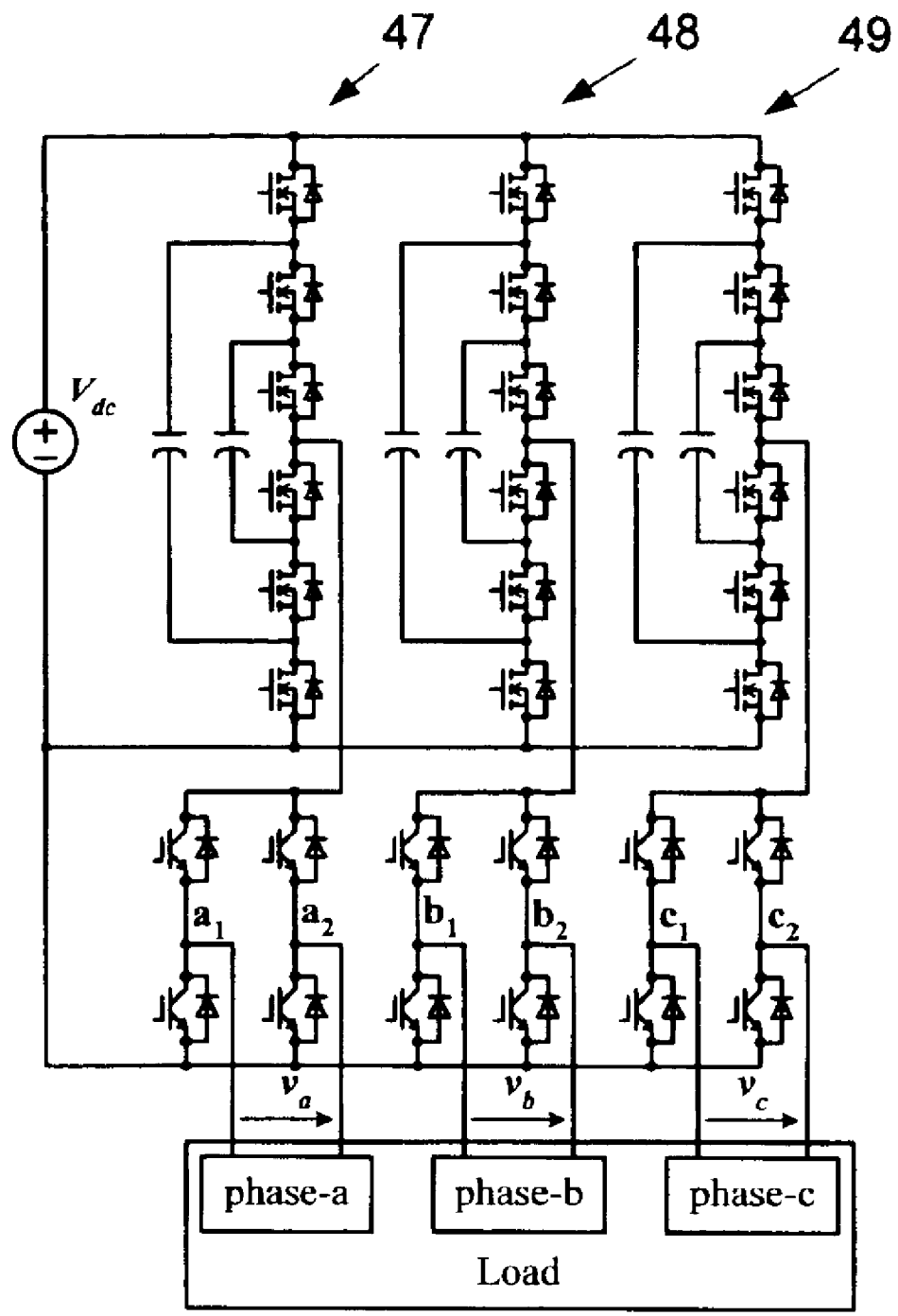
FIG. 25 is a schematic view of a three-phase inverter of the present invention using capacitor-clamped legs.

For multi-phase loads in which the phase switching components of the inverter are not connected electrically, the diode-clamped and/or the capacitor-clamped legs can share a single voltage source. FIGS. 24 and 25 show a seven-level three-phase inverter using three diode-clamped legs 44, 45 and 46 and three capacitor-clamped legs 47, 48 and 49, respectively. FIG. 24 shows a seven-level (m=7) three-phase inverter using the diode-clamped legs 44, 45 and 46 sharing a single voltage source, $V_{dc}$, for loads for phase a, phase b and phase c, in which the phase switching components of the inverter are not connected electrically. FIG. 25 shows a seven-level (m=7) three-phase inverter using the capacitor-clamped legs 47, 48 and 49 sharing a single voltage source, $V_{dc}$, for loads for phase a, phase b and phase c, in which the phase switching components of the inverter are not connected electrically.

This has been a description of the preferred embodiments of the invention. It will be apparent to those of ordinary skill in the art that modifications can be made to certain of the details of the preferred embodiments without departing from the scope and spirit of the invention, and these embodiments and their modifications are also intended to come within the scope of the following claims.

I claim:

1. A circuit for controlling an ac machine having a stator with stator windings and a rotor, the circuit comprising:
    a full bridge network of commutation switches which are connected to supply at least one phase voltage to the stator windings;
    a plurality of diodes, each in parallel connection to a respective one of the commutation switches for allowing conduction of current in a reverse direction to bypass each respective commutation switch;
    a plurality of dc source connections for receiving a plurality of incremental dc voltages and for applying a selected sum of said incremental dc voltages to said full bridge network of commutation switches over successive time intervals to approximate a sinusoidal voltage; and
    a controller connected for control of said dc source connections and said full bridge network of commutation switches to output a substantially sinusoidal phase voltage to the stator windings.

2. The circuit of claim 1, wherein the dc source connections comprise at least one diode-clamped phase leg for providing multiple levels of dc bus voltage.

3. The circuit of claim 1, wherein the dc source connections comprise at least one flying capacitor phase leg for providing multiple levels of dc bus voltage.

4. The circuit of claim 1, wherein dc source connections comprise a plurality of half-bridge cells connected in series, each cell having a corresponding dc source.

5. The circuit of claim 4, wherein at least one of the plurality of half-bridge cells has a different level of dc source voltage than other half-bridge cells in the plurality of cells.

6. The circuit of claim 1, wherein the dc source connections each have a plurality of switches, and wherein said switches are operated by the controller for producing pulse width modulation signals to a load.

7. The circuit of claim 1, wherein each of the plurality of dc source connections has a plurality of dc source voltage levels.

8. The circuit of claim 1, wherein the incremental dc voltages are not all equal.

9. The circuit of claim 1, wherein for a plurality of dc incremental dc voltages=m, the commutation switches and the switches included in the dc source connections=m+3.

10. A polyphase control circuit for controlling an ac machine having a stator with stator windings and a rotor, the control circuit comprising:
    a plurality of full bridge networks of commutation switches which are connected to apply corresponding phase voltages to the stator windings;
    a plurality of diodes, each in parallel connection to a respective one of commutation switches for allowing conduction of current in a reverse direction to bypass each respective commutation switch;
    a plurality of dc source connections for receiving a plurality of incremental dc voltages and for applying a selected sum of said incremental dc voltages to said full bridge networks of commutation switches over successive time intervals to provide approximately sinusoidal phase voltages; and
    the polyphase control circuit further comprising a controller connected for control of said dc source connections and said full bridge networks of commutation switches for each of the phase voltages to output substantially sinusoidal phase voltages to the stator windings.

11. The circuit of claim 10, wherein the dc source connections for each of the phase voltages comprise at least one diode-clamped phase leg for providing multiple levels of dc bus voltage, and wherein the dc source connections for each of the phase voltages include a corresponding dc source.

12. The circuit of claim 10, wherein the dc source connections for each of the phase voltages comprise at least one diode-clamped phase leg for providing multiple levels of dc bus voltage, and wherein the dc source connections for each of the phase voltages receive dc voltage from a common dc source.

13. The circuit of claim 10, wherein the dc source connections for each of the phase voltages comprise at least one flying capacitor phase leg for providing multiple levels of dc bus voltage, and wherein the dc source connections for each of the phase voltages includes a corresponding dc source.

14. The circuit of claim 10, wherein the dc source connections for each of the phase voltages comprise at least one flying capacitor phase leg for providing multiple levels of dc bus voltage, and wherein the dc source connections for each of the phase voltages receive dc voltage from a common dc source.

15. The circuit of claim 10, wherein dc source connections for each phase comprise a plurality of half-bridge cells connected in series, each cell including a corresponding dc source.

16. A method of controlling an ac machine having a stator with stator windings and a rotor, the method comprising:
    turning on in sequence a full bridge network of primary commutation switches connected to apply a phase voltage to the stator windings of the machine, said switches being turned on and off so as to produce a positive half cycle and a negative half cycle of said phase voltage;
    producing a plurality of incremental dc voltages; and
    applying a varying sum of the plurality of incremental dc voltages to said plurality of commutation switches to apply an approximately sinusoidal phase voltage having a positive half cycle and a negative half cycle.

17. The method of claim 16, further comprising dividing a dc voltage from an external dc voltage source into incremental dc voltages.

18. The method of claim 17, wherein the dc voltage is divided by a plurality of clamping diodes connected across selected semiconductor switches in a series of semiconductor switches.

19. The method of claim 17, wherein the dc voltage is divided by a plurality of clamping capacitors connected across selected semiconductor switches in a series of semiconductor switches.

20. The method of claim 16, further comprising:

providing a plurality of dc voltages sources;

producing a plurality of incremental dc voltages from each of said plurality of dc voltage sources; and applying a varying sum of the plurality of incremental dc voltages to said plurality of commutation switches.

* * * * *